United States Patent
Holzapfel et al.

[19]

[11] Patent Number: 6,097,490

[45] Date of Patent: *Aug. 1, 2000

[54] OPTICAL POSITION MEASURING INSTRUMENT FOR GENERATING A REFERENCE PULSE SIGNAL

[75] Inventors: Wolfgang Holzapfel, Obing; Elmar Josef Mayer, Tacherting/Reit, both of Germany

[73] Assignee: Dr. Johannes Heidenhain GmbH, Traunreut, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/103,327

[22] Filed: Jun. 23, 1998

[30] Foreign Application Priority Data

Jun. 25, 1997 [DE] Germany .......................... 197 26 935

[51] Int. Cl.[7] .................................................. G01B 11/14
[52] U.S. Cl. ...................................... 356/373; 250/237 G
[58] Field of Search ................................... 356/373, 356, 356/374; 250/237 G, 231.13

[56] References Cited

U.S. PATENT DOCUMENTS

| | | |
|---|---|---|
| 4,823,001 | 4/1989 | Kobayashi et al. . |
| 5,065,017 | 11/1991 | Hoech . |
| 5,067,816 | 11/1991 | Ichikawa ................................ 356/373 |
| 5,428,445 | 6/1995 | Holzapfel ................................ 356/356 |

FOREIGN PATENT DOCUMENTS 1 814 785   6/1970   Germany .

*Primary Examiner*—Frank G. Font
*Assistant Examiner*—Tu T. Nguyen
*Attorney, Agent, or Firm*—Brinks Hofer Gilson & Lione

[57] ABSTRACT

An optical position measuring instrument, by way of which, along with other position signals regarding the relative location of two objects movable relative to one another, additionally at least one reference pulse signal regarding a defined relative position of the two objects can be generated. This instrument includes a light source, and a reference pulse transmission structure disposed upstream of the light source, which structure has a first irregular distribution of regions with two different optical properties, the beam path being divergent between the light source (LQ) and the reference pulse transmission structure (S). In addition, a reference pulse scale structure is provided adjacent to the transmission structure; this scale structure has an irregular distribution of regions with two different optical properties. Furthermore, a reference pulse scanning structure is provided downstream of the reference pulse scale structure and has a third irregular distribution of regions with two different optical properties. The reference pulse scale structure is disposed in movable fashion relative to the reference pulse transmission structure and the reference pulse scanning structure. The three distributions of regions with different optical properties are selected such that in the case of a defined relative position of the structures movable relative to one another, a reference pulse signal of adequate intensity results.

37 Claims, 5 Drawing Sheets

OPTICAL POSITION MEASURING INSTRUMENT FOR GENERATING A REFERENCE PULSE SIGNAL

FIELD OF THE INVENTION

The present invention relates to an optical position measuring instrument in which along with the generation of incremental position data at least one reference pulse signal is generated at a defined relative location of two objects movable in relation to one another.

BACKGROUND OF THE INVENTION

Known optical, incremental position measuring instruments include not only one or more incremental divisions on a scale and scanning unit but, typically, also include one or more fields with reference marks or reference mark structures for generating reference pulse signals. The reference pulse signals are used for unambiguous identification of defined relative positions of two objects movable in relation to one another whose relative motion is intended to be detected with the aid of the optical position measuring instrument. For example, the objects that are movable in relation to one another may be a workpiece and a tool of a numerically controlled machine tool.

Typically, the reference mark structure on the scale and scanning unit include a number of alternatingly disposed regions having optically different properties. Depending on whether the position measuring instrument is operated with transmitted light or reflected light, the alternatingly disposed regions are either optically transparent and opaque, or reflective and nonreflective. Typically, both on the scale and on the scanning unit, identical periodic structures are disposed in a reference mark field and the reference mark field is illuminated with a collimated beam. Each transparent or non-reflective region on the scale is assigned a transparent or non-reflective region respectfully on the scanning unit, at exactly the same corresponding relative position. German Patent Disclosure No. DE 18 14 785, assigned to the present assignee and incorporated herein by reference discloses such periodic structures.

U.S. Pat. No. 5,065,017, for example, discloses optimized reference mark structures on the scale and scanning unit so that at a defined relative position of the scale and scanning unit, a pronounced maximum signal results, while secondary maximums are suppressed as much as possible. This is achieved by certain aperiodic distributions of the regions with different optical properties. Both on the scale and the scanner, however, identical distributions of the corresponding regions are provided for that purpose.

In addition, with respect to the optical position measuring instruments discussed thus far in which the scale and scanner divisions are illuminated by a collimated beam, optical position measuring instruments utilizing so-called divergent illumination are also known. In such position measuring instruments, voluminous collimation optics are not needed between the light source and the first division structure through which the beams pass, and thus, in particular, a compact design of the optical position measuring instrument is possible. U.S. Pat. No. 4,823,001 discloses such an example.

In these optical position measuring instruments as well, it is desirable to be able to generate reference pulse signals with regard to certain relative positions of the scale and the scanning unit. No suggestion, however, of generating a reference pulse signal is mentioned in this patent.

The aforementioned position measuring instruments, however, are unsuitable for generating a reference pulse signal utilizing divergent illumination. In these instruments, the dimensioning of the corresponding structures on the scale and scanner are always based on a collimated beam that illuminates the structures.

SUMMARY OF THE INVENTION

It is therefore an object of the present invention to provide an optical position measuring instrument which requires no collimation optics and generates a high-resolution reference pulse signal at one or more defined positions of two objects movable with reference to one another.

According to the present invention a total of three irregular or aperiodic reference pulse structures are adapted to one another in such a way that even in the case of divergent illumination of the various structures, the most pronounced possible maximum of the reference pulse signal will result at one or more defined relative positions of the scale and the scanning unit. A reference pulse transmission structure, a reference pulse scanning structure and a reference pulse scale structure are adapted purposefully to one another by a suitable optimizing process.

It is thus possible to generate a narrow, high-resolution reference pulse even in an extremely compactly constructed optical position measuring instrument. The compact construction of the overall system is the result of the elimination of collimation optics, which are otherwise usually, present when utilizing collimated illumination. The present invention can be used in both transmitted-light and reflected-light types of position measuring instruments. Moreover, the present invention can be implemented in both position measuring instruments for detecting linear motions and position measuring instruments for detecting rotary motions.

Another advantage of an optical position measuring instrument according to the present invention is that in certain arrangements of the structures for generating the reference pulse signals, high Moiré insensitivity relative to an incremental division results. Particularly if possible slight relative rotation of the scale division and the scanning unit occurs about an axis at right angles to the measurement direction, the shape and location of the reference pulse signal generated according to the present invention practically does not change at all.

The present invention also proves especially advantageous for generating a second reference pulse signal along with the first reference pulse signal that is complementary to the first reference pulse signal. In this way the security of detection in detecting and evaluating the reference pulse signals can be increased.

Further advantages of an optical position measuring instrument according to the preferred embodiments of the present invention will become apparent from the ensuing description of preferred embodiments in conjunction with the drawings.

BRIEF DESCRIPTION OF THE DRAWINGS

FIG. 3b is a graph of a second, complementary reference pulse signal, which is complementary to the reference pulse signal of FIG. 3a.

DETAILED DESCRIPTION OF THE PRESENTLY PREFERRED EMBODIMENTS

Figure 1:
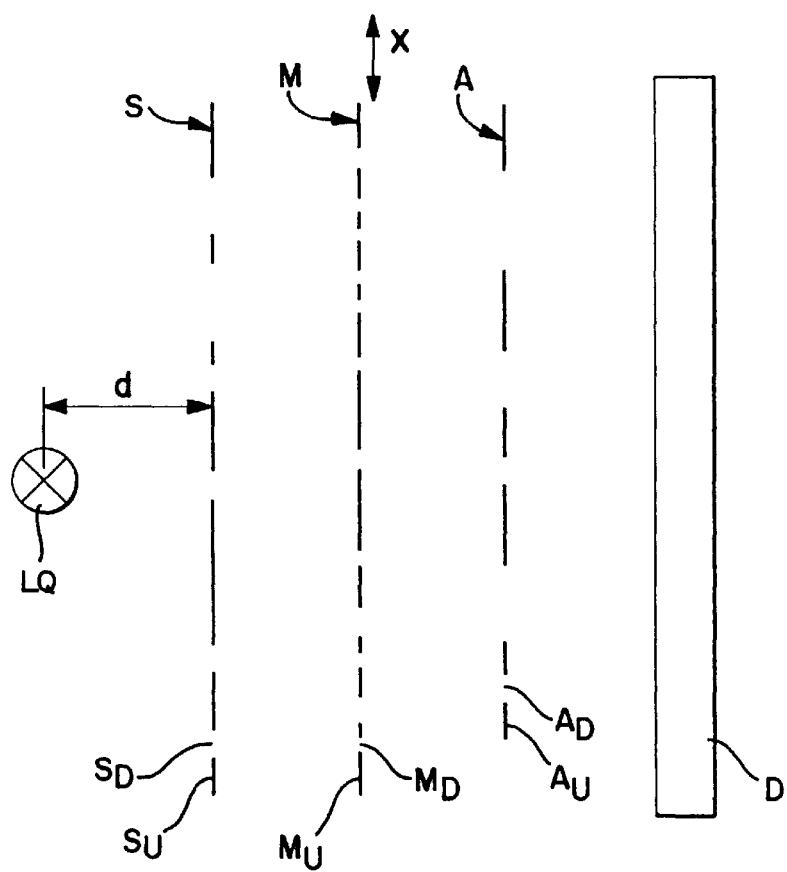
FIG. 1 schematically shows a preferred embodiment of various structures in a transmitted-light type optical position measuring instrument according to the present invention.

FIG. 1 schematically shows a preferred embodiment of various structures in a transmitted-light type optical position measuring instrument according to the present invention. Only those components of the position measuring instrument that are used to generate a reference pulse signal according to the invention are shown. Those parts by way of which incremental position signals can be generated in a known manner have been omitted for the sake of simplicity.

The optical position measuring instrument according to the invention includes a light source LQ, for example, such as an LED. The light source LQ is followed in the direction of the beam propagation by a reference pulse transmission structure S, which has an irregular or a periodic first distribution of regions $S_U$, $S_D$ of different optical properties. In the preferred embodiment of a transmitted-light type optical position measuring instrument, the regions $S_D$, $S_U$ of the reference pulse transmission structure S are embodied as alternatingly optically transparent and opaque regions. Between the light source LQ and the reference pulse transmission structure S, in contrast to known optical position measuring instruments, the preferred embodiment shown has no additional optics used to collimate the beam emitted by the light source. In the optical position measuring instrument of the invention, accordingly, a divergent beam path is contemplated between the light source and the downstream reference pulse transmission structure, or in other words divergent illumination. This makes an extremely compact construction possible.

As an alternative to the variant shown without any collimator optics, a light source LQ can also be used which is preceded by at least one optical element for partial collimation, but either way, the result is still a divergent projection characteristic of the light source. This last variant is particularly suitable if greater signal intensity on the part of the detection should be necessary. For a suitable selection of a distribution of the various regions $S_U$, $S_D$, within the reference pulse transmission structure, see the description that follows.

In the preferred embodiment of FIG. 1, the light source LQ is disposed at a defined spacing or distance d from the reference pulse transmission structure S. Along with the variant shown, in which d>0 is selected, the spacing d between the light source LQ and the reference pulse transmission structure S may, however, also be selected as markedly less, down to the special case where d=0. By varying the spacing d, the divergence of the light source LQ can be varied. Depending on the selected spacing d, the structures to be selected for generating the reference pulse signal will vary.

In the direction of beam propagation, the reference pulse transmission structure S is followed by a reference pulse scale structure M, which has a second irregular distribution of regions $M_U$, $M_D$, having two different optical properties. The reference pulse scale structure M is disposed such that it is movable in the measurement direction X relative to the reference pulse transmission structure S. For a transmitted-light type optical position measuring instrument the regions bordering the reference pulse scale structure M on the scale in the X direction are opaque. Accordingly only a portion of a region of the scanned scale is shown in FIG. 1.

The optical position measuring instrument of the invention further includes a reference pulse scanning structure A having a third irregular distribution of regions $A_U$, $A_D$, having different optical properties. The reference pulse scanning structure A is followed by an optoelectronic detector element D, by way of which the beams that have passed through the three reference pulse structures S, M, A and that depending on the relative position of the various structures S, M, A generate a predetermined intensity pattern in the detector plane, are detected. An evaluation electronic unit (not shown) is located downstream of the detector element D.

Along with the arrangement of the various components, schematically shown in FIG. 1 of the optical position measuring instrument according to the invention naturally alternative possible arrangements exist as well, which differ from one another for example in the spacings of the individual components. For example, the reference pulse transmission structure S may be disposed directly upstream of the light source LQ, as noted above. Moreover, the reference pulse transmission structure could be embodied in the form of structuring of the light-emitting surface of a suitable light source. Another option for realizing the reference pulse transmission structure is to select a light source that has a three-dimensional projection characteristic corresponding to the transmission structure. It is also possible to form the reference pulse scanning structure A by structuring the light-sensitive surface of the detector element D, and so forth.

In the embodiment of the optical position measuring instrument shown, compared to the reference pulse scale structure M, the other components shown in FIG. 1, such as the light source LQ, reference pulse transmission structure S, reference pulse scanning structure A, and the optoelectronic detector element D are disposed so as to be movable in the measurement direction X. These last components LQ, S, A and D may for instance be disposed on a substrate element in a suitably embodied scanning unit that is displaceable relative to the reference pulse scale structure M. The reference pulse scale structure M is disposed on a suitable scale, which, for example, comprises a glass division substrate, on which one or more known incremental scale divisions are disposed as well. The scale and the scanning unit are, for example, connected to two parts of a machine tool that are movable relative to one another, and whose relative position is to be determined with high precision by the optical position measuring instrument of the invention.

FIG. 1 shows a transmitted-light type of optical position measuring instrument. The various regions $S_U$, $S_D$, $M_U$, $M_D$, $A_U$, $A_D$ of the various structures S, M, A with different optical properties are therefore embodied as transparent and opaque regions for the wavelength of radiation used. In the case of a reflected-light embodiment, by comparison, the reference pulse scale structure (M), for instance, would be embodied such that reflective and nonreflective regions are disposed correspondingly irregularly. Alternatingly arranged transparent and opaque regions would then also be provided on the reference pulse transmission structure and the reference pulse scanning structure.

In a further embodiment, it would be possible to embody the regions having different optical properties in such a way that regions are provided that have a fine grating structuring, while the other regions have no such structuring. A number of possibilities thus exist for how the regions with different optical properties can be designed.

According to the invention, the total of three distributions of regions $S_U$, $S_D$, $M_U$, $M_D$, $A_U$, $A_D$ with various optical properties can be adapted to one another or selected accordingly so that in the case of a defined relative position of the structures, a reference pulse signal of adequate intensity is detectable by the detector element D. Adequate suppression of any possible secondary maximum signal values is also assured.

Particularly with the optimized distributions, it is assured that an interaction of the beam arriving from a region $M_U$, $M_D$ of the reference pulse scale structure M with a plurality of regions $A_U$, $A_D$ of the reference pulse scanning structure A occurs. In the case of a reflective and nonreflective reference pulse scale structure M and a transparent and opaque reference pulse scanning structure (A), for instance, this means that at a defined relative position, beams from one region $M_U$, $M_D$ of the reference pulse scale structure $M_U$, $M_D$, pass through a plurality of optically transparent regions A, of the reference pulse scanning structure A.

Figure 2A:
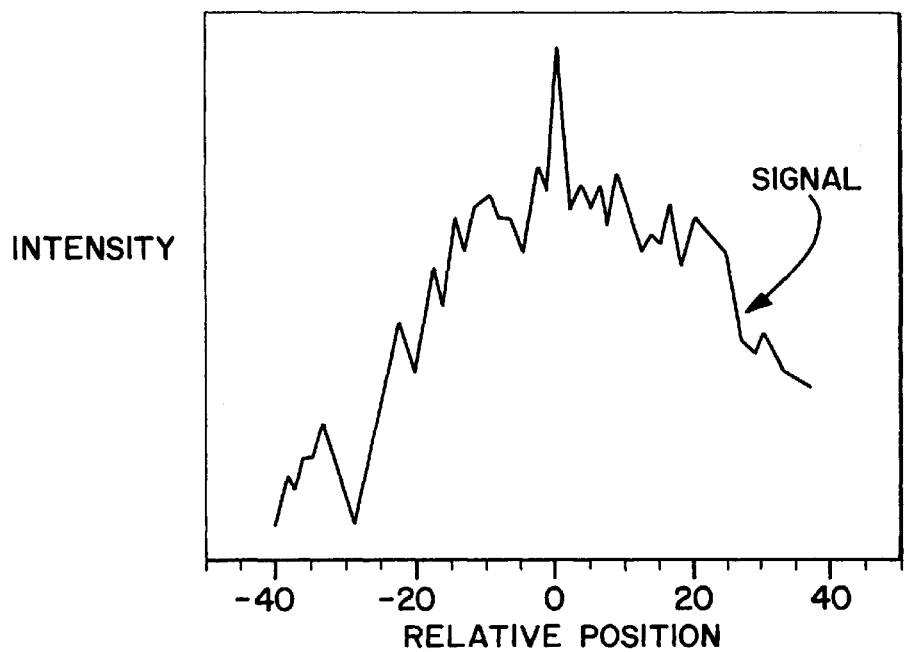
FIG. 2a is a graph of a reference pulse signal generated according to the invention according to a preferred embodiment of the present invention.

The course of intensity of a reference pulse signal that results at a relative position, designed as "zero", of the scale and scanning unit with distributions selected according to the invention is shown in FIG. 2a. Because the distributions of regions $S_U$, $S_D$, $M_U$, $M_D$, $A_U$, $A_D$ with different optical properties are adapted suitably to one another, adequate signal intensity or an adequate useful component of the signal at the "zero" position of the scale and scanning unit is assured.

It is understood that the optical position measuring instrument embodied according to the invention can be equipped with such structures for generating a reference pulse signal not merely at a single defined relative position of the parts movable relative to one another; on the contrary, it is possible to dispose corresponding fields with reference pulse scale structures M as in FIG. 1 at various positions on the scale.

It should also be noted here that the terms used with regard to the transmission, scale and scanning structures as well as the relative disposition of the parts movable relative to one another should be understood as merely examples. Accordingly, it is highly possible to transpose elements that perform these functions. For instance, the grating through which the light passes first in this example could function as a scale division and so forth.

The irregular distribution of the regions $S_U$, $S_D$, $M_U$, $M_D$, $A_U$, $A_D$ with different optical properties for generating a reference pulse signal at a defined relative position of the two parts movable relative to one another result by way of an optimizing method which will be explained below in conjunction with FIG. 4. This is one possible preferred embodiment of a suitable optimizing method; that is, it is entirely possible to use alternative variants to ascertain the various distributions. All the optimizing methods are preferably performed numerically with the aid of a suitable computer. The goal of the optimizing methods is that the distributions of the regions that in a transmitted-light variant are transparent and opaque, that is, regions $S_U$, $S_D$, $M_U$, $M_D$, $A_U$, $A_D$ on the various structures S, M and A assure a reference pulse signal of adequate intensity at the relative position "0" to be detected. Any secondary maximum values that may result should be suppressed as much as possible, because of the requisite detection assurance for the reference pulse signal.

Figure 4:
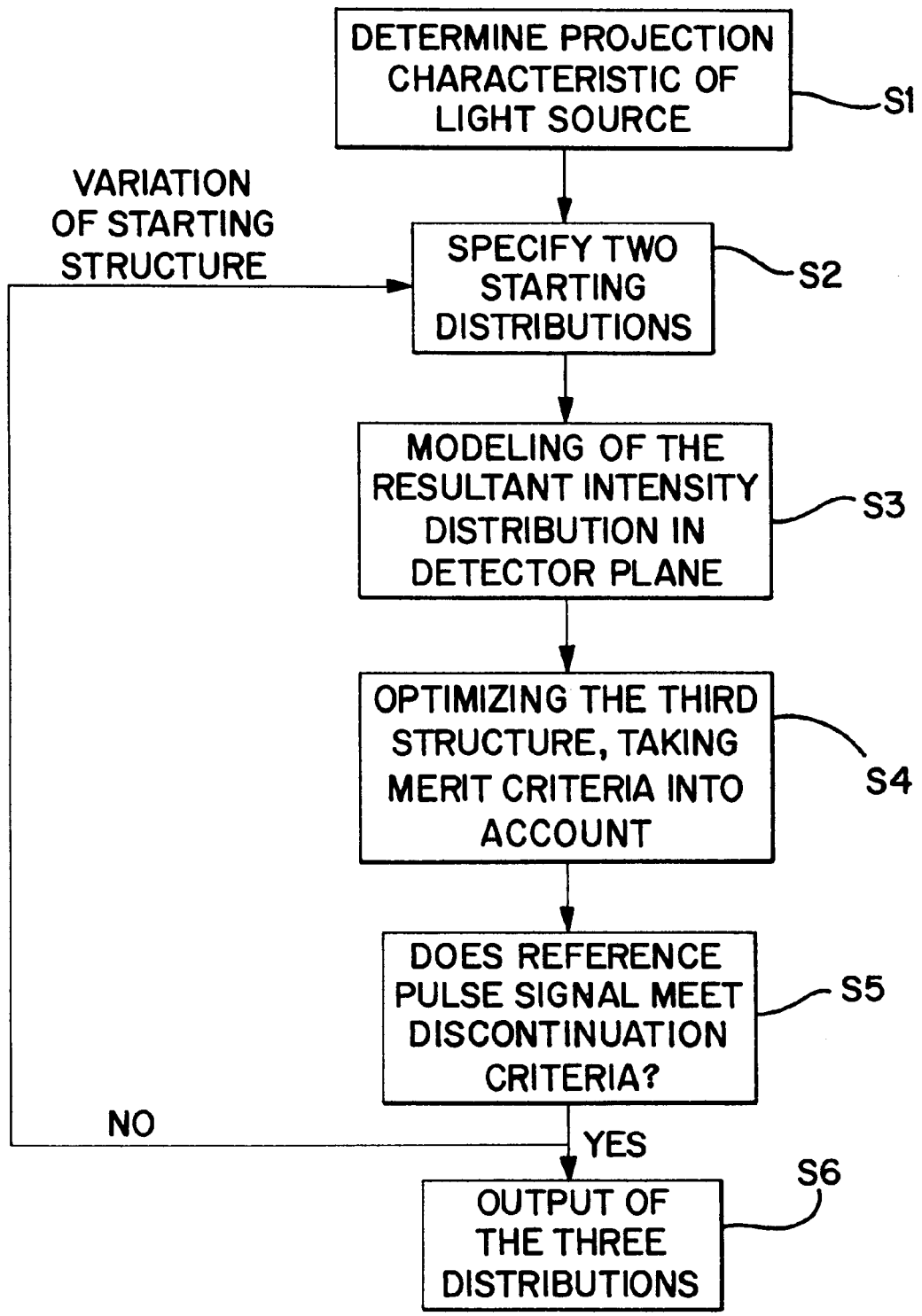
FIG. 4 is a flowchart explaining an optimizing process by which suitable distributions of the various structures can be determined.

In the optimizing method of FIG. 4, in the first step S1 the projection characteristic of a divergent light source LQ, that is, the corresponding parameters, are determined. In the next step S2, then two of the three irregular distributions of regions with different optical properties are arbitrarily specified. For instance, the distribution of the various regions for the reference pulse transmission structure S and the distribution for the reference pulse scale structure M can be specified as the starting structures. In principle, however, any two other structures can arbitrarily be specified instead.

As the basis for the distribution of the two structures, in the next step S3 of the optimizing method the resultant intensity distribution is numerical modeled or determined in a detector plane. In a practical embodiment of the optimizing method, a position measuring instrument that is operated according to the projecting-light principle is assumed for the determination of the resultant intensity distribution in S3. It is understood that at the cost of greater computation effort and expense, diffraction efforts can also be taken into account.

Once the intensity distribution in the detector plane is known, the distribution of the regions of different optical properties in the reference pulse scanning structure A are optimized, taking into account individual so-called merit criteria, in step S4. Accordingly, the third, until now not specified distribution of the reference pulse scanning structure A is optimized as a function of the two specified starting structures S, M. Suitable merit criteria for optimizing the third distribution A are, for instance, the highest possible degree of modulation of the reference pulse signal, and/or the resultant useful component of the reference pulse signal in the detector plane. For the actual optimization, taking the aforementioned merit criteria into account, the intensity distribution of the reference pulse signal in the detector plane is observed while the distribution of the regions of different optical properties on the reference pulse scanning structure A is varied.

In step S5, a check is made as to the extent to which the current combination of the three distributions, and the resultant reference pulse signal, satisfy a particular discontinuation criterion. If they do, then the optimizing method is discontinued, and in step S6 the corresponding distributions for the regions with different optical properties of the three structures S, M and A are output.

If the predetermined discontinuation criteria cannot be satisfied by optimizing the third distribution or structure, then in the next run of the algorithm in step S2, one of the starting structures is varied and one of the other structures is optimized as described above.

In this way, the three distributions of the regions of the reference pulse transmission structure S, the reference pulse scale structure M and the reference pulse scanning structure A are optimized in stages, until the resultant reference pulse signal corresponds to the specified requirements.

The three distributions, determined by means of this kind of optimization algorithm, for the regions of different optical properties are shown in Table 1a, for the exemplary embodiment of a reference pulse signal shown in FIG. 2a.

TABLE 1a

Reference pulse transmission structure S (11 regions, width 40 μm each)
Transparent regions: 1, 4, 6, 10
Reference pulse scale structure M (45 regions, width 20 μm each)
Transparent regions: 1, 3, 5, 6, 7, 8, 9, 14, 15, 17, 19, 21, 24, 28, 33, 34, 35, 39, 40, 43, 44
Reference pulse scanning structure M (23 regions, width 40 μm each)
Transparent regions: 1, 2, 5, 7, 8, 10, 12, 15, 20, 21, 22, 23

The numerals given in Table 1a, which are associated with the distributions of the reference pulse transmission structure, scale structure and scanning structure, indicate the numbers of the transparent partial regions of the respective structure, if these structures are divided into a number of partial regions of equal width. The total number of partial regions of a given structure forms one field each. In the case of the reference pulse transmission structure, the complete field includes 11 partial regions with a width of 40 μm each in the measurement direction. The field having the reference pulse scale structure includes 45 partial regions, each 20 μm wide. The field with the reference pulse scanning structure has 20 partial regions, each 40 μm wide. In this preferred embodiment, a spacing of 0.7 mm was also assumed between the light source and the reference pulse transmission structure, between the reference pulse transmission structure and the reference pulse scale structure, and between the reference pulse scale structure and reference pulse scanning structure.

In the case of a reflected-light variant of the position measuring instrument according to the invention, the numerals given for the reference pulse scale structure would naturally correspond to the reflective regions; the other two structures could conversely be embodied identically to the transparent/opaque reference pulse transmission structure and scanning structures of the transmitted-light variant.

The variant represented in Table 1a for the three distributions of the regions on the reference pulse structures S, M and A furnishes a reference pulse signal approximately 20 μm wide, for an incremental scale division with a division period of 20 μm.

In Table 1b below, a preferred embodiment of a distribution according to the invention of regions of the various structures for generating a complementary, second reference pulse signal to the first reference pulse signal of FIG. 1 or Table 1a is shown. This preferred embodiment differs from the previous exemplary embodiment in the differently optimized reference pulse scanning structure; that is, the other two structures are identical to the previous example.

TABLE 1b

Reference pulse transmission structure S (11 regions, width 40 μm each)
Transparent regions: 1, 4, 6, 10
Reference pulse scale structure M (45 regions, width 20 μm each)
Transparent regions: 1, 3, 5, 6, 7, 8, 9, 14, 15, 17, 19, 21, 24, 28, 33, 34, 35, 39, 40, 43, 44
Reference pulse scanning structure A(23 regions, width 40 μm each)
Transparent regions: 3, 4, 9, 11, 13, 14, 18, 19

Figure 2B:
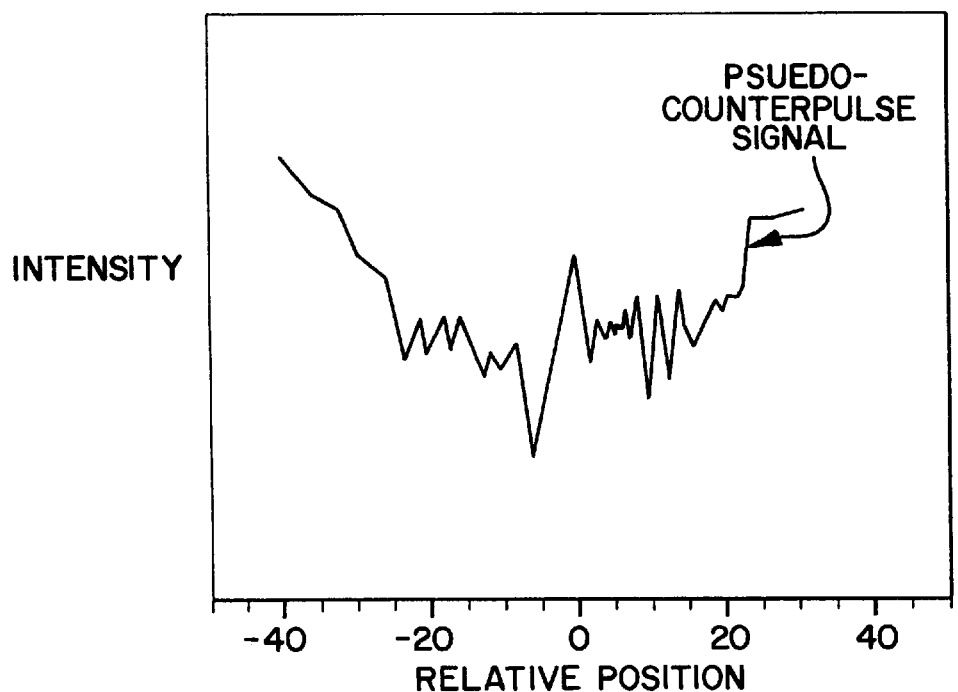
FIG. 2b is a graph of a second reference pulse signal, complementary to the reference pulse signal of FIG. 2a according to a preferred embodiment of the present invention.

With this kind of distribution, it is thus possible, along with the aforementioned first reference pulse signal, to generate a further, second reference pulse signal, which will hereinafter be called the complementary signal to the first reference pulse signal. The first example, shown in FIG. 2b, of a complementary reference pulse signal can also be called a pseudo-counterpulse signal. The corresponding signal course of the reference pulse signal that results from a distribution in accordance with table 1b is shown in FIG. 2b.

Figure 2C:
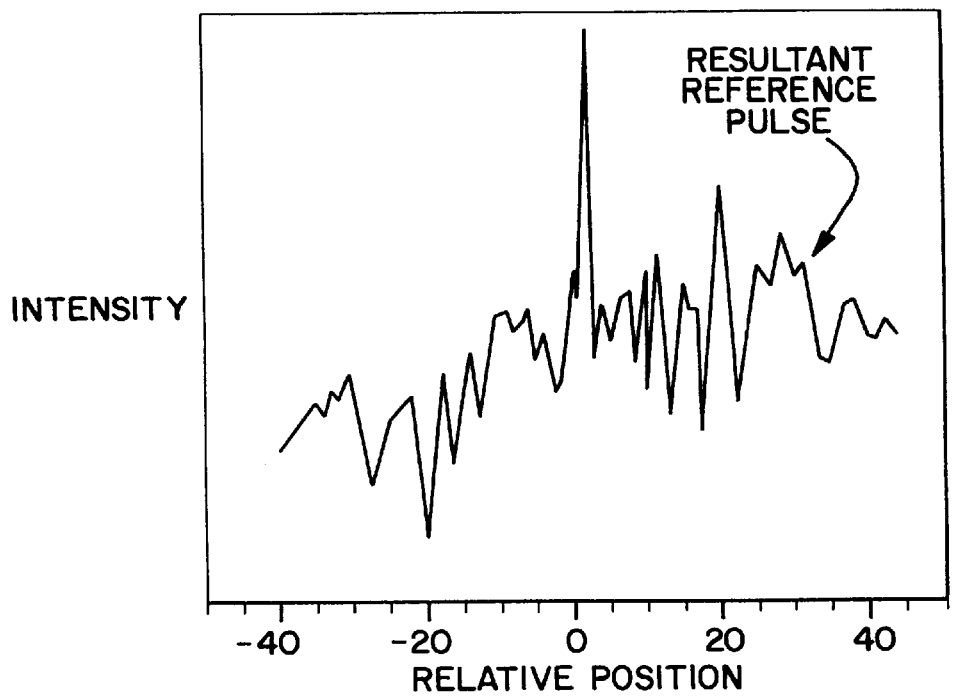
FIG. 2c is a graph of a resultant reference pulse signal of the two reference pulse signals formed in FIGS. 2a and 2b.

With the aid of an available complementary reference pulse signal, the detection assurance with regard to this signal can be increased, and in particular the signal to noise ratio can be increased. Thus then the two single reference pulse signals of FIG. 2a and 2b are combined suitably with one another electronically, by connecting the two reference pulse signals subtractively. The result finally is a resultant reference pulse signal $I_S=I_a-I_b$, as shown in FIG. 2c. In the signal course shown in FIG. 2c, the now increased useful portion of the resultant reference pulse signal is clearly apparent in comparison with the two single signals in FIGS. 2a and 2b.

A further option for generating a second, complementary reference pulse signal is to embody the reference pulse scale structures of the complementary, second reference pulse signal inversely to the reference pulse scale structures of the first reference pulse signal. Generating the complementary, second reference pulse signal is thus equivalent to the known forming of a so-called "real" push-pull reference pulse signal. In the case of structures with reflective and nonreflective regions, this means approximately that at the applicable point of the reference pulse scale structure for the first reference pulse signal, where a reflective region is located, for instance, a nonreflective region is disposed for the reference pulse scale structure of the second, complementary reference pulse signal, and so forth.

Figure 3A:
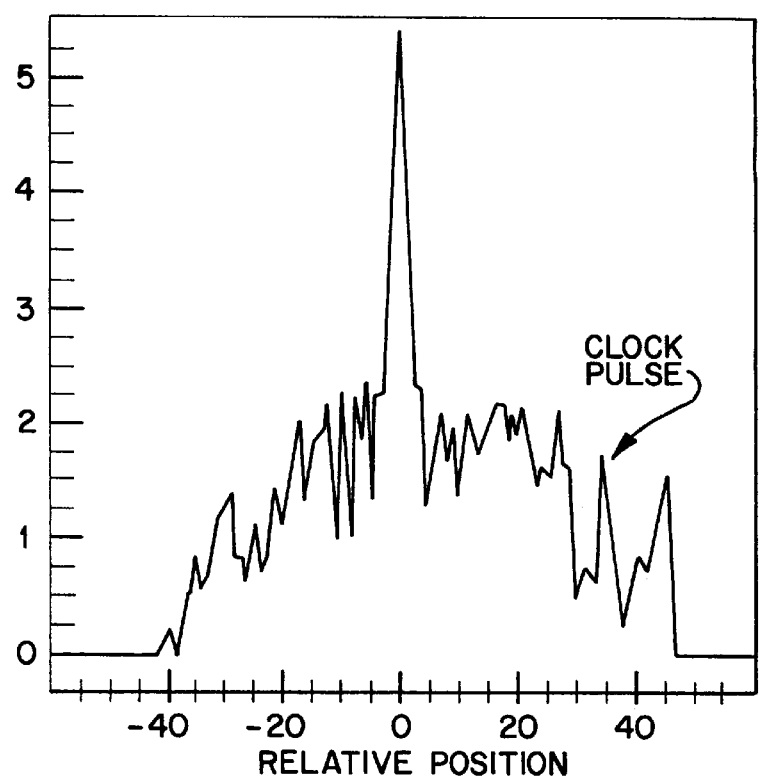
FIG. 3a is a graph of a reference pulse signal that results from a second preferred embodiment of the present invention.
Figure 3B:
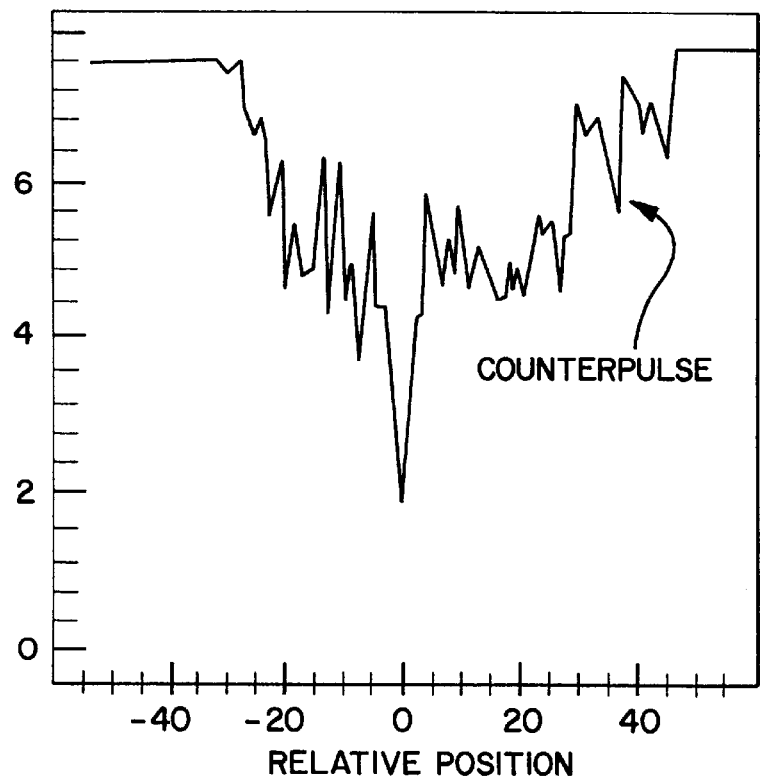

The signal course of a first reference pulse signal, generated according to the invention, is shown in FIG. 3a. A second exemplary embodiment for the generation of a complementary, second reference pulse signal is shown in FIGS. 3b, now embodied as noted above as a "real" counterpulse reference pulse signal.

In Table 2a below, the distribution of regions within the various structures is again listed, by way of which regions it is possible to generate a signal form according to FIG. 3a.

TABLE 2a

Reference pulse transmission structure S (15 regions, width 40 μm each)
Transparent regions: 1, 2, 4, 5, 7, 9, 11, 14, 15
Reference pulse scale structure M (45 regions, width 20 μm each)
Transparent regions: 1, 5, 6, 8, 16, 17, 21, 23, 25, 29, 34, 35, 36, 45.
Reference pulse scanning structure A (23 regions, width 40 μm each)
Transparent regions: 1, 9, 3, 19, 22, 23

A "real" counterpulse reference pulse signal in accordance with FIG. 3b is obtained on the basis of distributions for the various structures as shown in Table 2b below.

TABLE 2b

Reference pulse transmission structure S (15 regions, width 40 μm each)
Transparent regions: 1, 2, 4, 5, 7, 9, 11, 14, 15
Reference pulse scale structure M (45 regions, width 20 μm each)

TABLE 2b-continued

Transparent regions: 2, 3, 4, 7, 9, 10, 11, 12, 13, 14, 15, 18, 19, 20, 22, 24, 26, 27, 28, 30, 31, 32, 33, 37, 38, 39, 40, 41, 42, 43, 44
Reference pulse scanning structure A (23 regions, width 40 μm each)
Transparent regions: 1, 9, 3, 19, 22, 23

To generate the two different signal forms shown in FIGS. 3a and 3b, accordingly, distributions that are inverse to one another of the regions on the reference pulse scale structures are accordingly provided. As a rule, to this end, two differently embodied fields with such distributions are disposed on the scale. The scanning of the two fields can be done with the aid of a scanning unit, which to generate the signal forms shown has identical reference pulse transmission structures and scanning structures.

With regard to the arrangement of the reference pulse structures embodied according to the invention relative to the incremental scale division of the optical position measuring instrument, a number of possibilities arise, which will be briefly explained below in terms of the preferred embodiments of FIGS. 5a–5d. In each case, a plan view on a scale is shown, with a scanning unit, not shown, movable in the X direction relative to it.

Figure 5A:
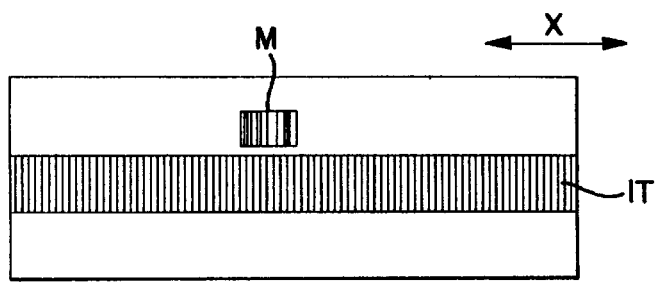
FIGS. 5a–5d each show various possibilities for arranging the reference pulse scale structures, embodied according to the present invention, relative to the incremental scale division on a scale.

In the preferred embodiment of FIG. 5a, a reference pulse scale structure M embodied according to the invention is disposed laterally adjacent to an incremental scale division IT, that is, perpendicular to the measurement direction X. Correspondingly, a reference pulse scanning structure is mounted laterally adjacent to the incremental scanning division on the scanning unit. With the aid of such an arrangement, a first reference pulse signal can accordingly be generated at a defined relative location of the scale and scanning unit.

Figure 5B:
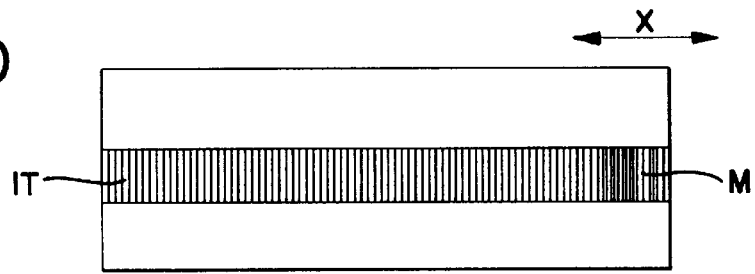

An alternative possibility of arranging the reference pulse scale structure embodied according to the invention is shown in FIGS. 5b. There it is provided that at least one corresponding reference pulse scale structure M be mounted on one end of the incremental scale division IT.

In principle it would naturally also be possible to integrate a reference pulse scale structure M, embodied according to the invention, directly with the incremental scale division IT and to embody the scanner side accordingly.

Figure 5C:
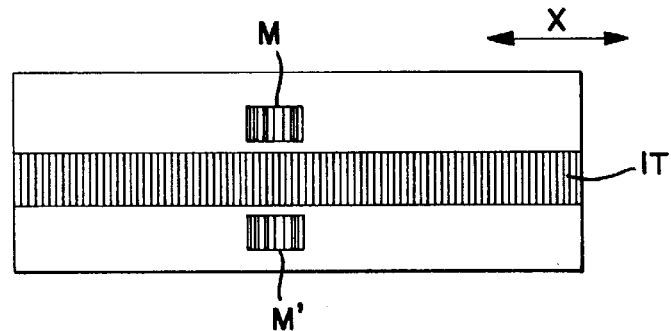

One possible way of disposing the reference pulse scale structures M, M', which generate a first and a second, complementary reference pulse signal at a defined relative position, is shown in FIG. 5c. The two reference pulse scale structures M, M' are arranged here laterally adjacent to the incremental scale division IT on the scale. The two reference pulse scale structures M, M' may be embodied identically to those of the preferred embodiments in Tables 1a and 1b. In a distinction from Tables 1a and 1b, however, the associated reference pulse scanning structures are embodied on the scanning unit (not shown) so that a complementary second reference pulse signal can be generated by scanning the reference pulse scale structure. As an alternative, the two reference pulse scale structures may also be embodied differently, while the reference pulse transmission structures and scanning structures required for the scanning are embodied identically; that is, this variant furnishes reference pulse signals in accordance with FIGS. 3a and 3b, on the basis of the divisions in Tables 2a and 2b.

Figure 5D:
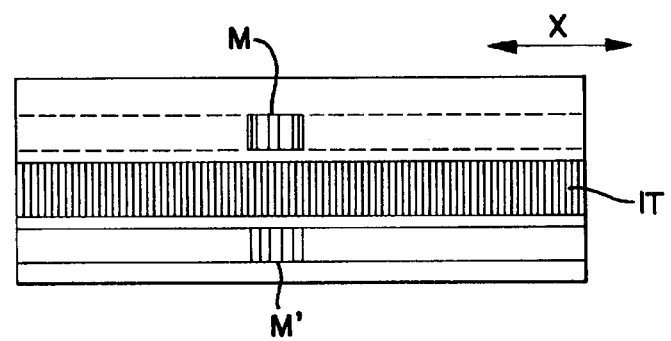

Particularly the embodiments of FIGS. 5b, 5c and 5d prove to be advantageous in terms of their Moiré insensitivity. This means that even if the scanning unit becomes twisted about an axis at right angles to the measurement direction X, a reference pulse signal at the desired position will still result.

It is equally possible, however, for reference pulse scale structures M and M' to be disposed laterally adjacent to the incremental scale division IT as in FIG. 5b; in a known manner, they furnish a clock pulse and counterpulse reference pulse signal. In this case, the various reference pulse structures are embodied inversely to one another; that is, at the same X position, transparent regions are provided in one of the two fields, while opaque regions are disposed in the other field, and so forth.

In the preferred embodiments shown in FIGS. 5a–5d, either scales for transmitted-light variants or reflected-light variants of the optical position measuring instrument of the invention may be involved. Depending on this, an either transparent or reflective incremental scale division IT will be used.

Figure 6:
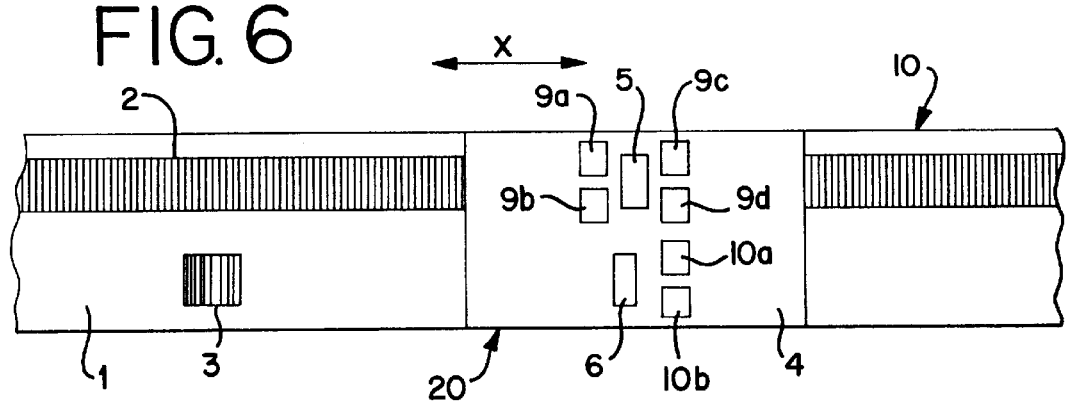
FIG. 6 is a plan view on a further preferred embodiment of an reflected-light type optical position measuring instrument according to a preferred embodiment of the present invention.

Another embodiment of the optical position measuring instrument of the invention is shown in a schematic view in FIG. 6; this involves an reflected-light variant.

In the plan view of FIG. 6, a scale 10 disposed in stationary fashion and a scanning unit 20 movable relative to it, in the measurement direction X, can be seen. The scale 10 comprises a division substrate 1, preferably of glass or steel, on which an incremental scale division 2 with a defined division period TP is disposed in the measurement direction X. In the region of the scale 10 shown, a field can also be seen on the division substrate 1 that contains the reference pulse scale structure 3 embodied according to the invention. Both the incremental scale division 2 and the reference pulse scale structure 3, in this embodiment of the position measuring instrument of the invention, are embodied as an alternating sequence of reflective and nonreflective regions. The longitudinal direction of the regions of different optical properties is oriented in the plane of the drawing at right angles to the measurement direction X.

To generate the incremental position signals, the scanning unit 20 includes a light source 5, preferably embodied as an LED. A total of four detector elements 9a, 9b, 9c, 9d can be seem around the light source 5; by which the beam reflected by the incremental scale division 2 is detected. The arrangement of the detector elements 9a–9d is done such that scanning signals in phase quadrature can be generated with them. Structures are also provided (not visible in FIG. 6) on a transparent substrate element 4 in the region upstream of the light source 5 they act as a transmission structure, while in the region upstream of the light-sensitive detector faces they act as scanning structures for the incremental scale division 2. The contacting of the detector elements 9a–9d and of the light source 5 is effected by means of a printed circuit board, also not shown, by way of which the mechanical stabilization of the scanning unit 20 is moreover achieved.

To generate reference pulse signals in accordance with the invention, a further light source 6 is provided on the scanning unit 20; this light source is likewise disposed on the substrate element 4 and can be contacted by a printed circuit board or a flexible conductor strip. Laterally adjacent to the light source 6, two detector elements 10a, 10b can be seen, by way of which a first and a second reference pulse signal can be detected. With the two detector elements 10a, 10b, reference pulse signals that are complementary to one another are detected, and they can be generated in accordance with the principles explained earlier herein.

The reference pulse transmission structure, in this embodiment, is disposed on the substrate element 4 of the scanning unit in the region upstream of the light source 6. Also mounted on the substrate element 4 are the reference pulse scanning structures upstream of the light-sensitive faces of the detector elements 10*a*, 10*b*.

The distributions of the transparent and opaque regions in the reference pulse transmission, scale and scanning structures, have once again been adapted to one another in accordance with the optimizing method explained above.

The preferred embodiment of the optical position measuring instrument according to the invention, shown in FIG. 6, assures an especially compact construction and makes it possible to generate high-resolution reference pulse signals. It is understood that other alternative, variant versions are feasible within the scope of the invention. For instance, it is also possible to use only a single light source on the scanning unit in order to generate both the incremental signals and the reference pulse signals. Moreover, as already noted, various possibilities exist with regard to generating two complementary reference pulse signals. For instance, identical transmission and scale structures but different scanning structures can be used. It is also possible to provide different transmission structures, an identical scale structure, and again two different scanning structures for generating the two complementary reference pulse signals. On the other hand, it is also possible to use a common transmission structure and different scale structures and scanning structures for the same purpose, and so forth.

The result, both within the scope of this embodiment and within the scope of the variants explained above, is a number of possibilities for varying the provisions of the invention depending on the use.

It is to be understood that the forms of the invention described herewith are to be taken as preferred examples and that various changes in the shape, size and arrangement of parts may be resorted to without departing from the spirit of the invention or scope of the claims.

What is claimed is:

1. An optical position measuring instrument for generating position signals regarding the relative location of two objects movable relative to one another, wherein the measuring instrument additionally generates at least one reference pulse signal regarding a defined relative position of the two objects, the measuring instrument comprising:

a light source for emitting a beam of light;

a reference pulse transmission structure disposed upstream of the light source having a first, irregular distribution of regions having two different optical properties wherein the beam of light has a beam path between the light source and the reference pulse transmission structure that is divergent;

a reference pulse scale structure, disposed adjacent to the reference pulse transmission structure, the reference pulse scale structure has a second irregular distribution of regions having two different optical properties;

a reference pulse scanning structure, disposed downstream of the reference pulse scale structure, the reference pulse scanning structure having a third irregular distribution of regions having two different optical properties, wherein the reference pulse scale structure is movable relative to the reference pulse transmission structure and the reference pulse scanning structure; and at least one optoelectronic detector element for detecting a beam output by the reference pulse scanning structure;

wherein the first, second and third irregular distribution of regions are selected such that at a defined relative position of the reference pulse transmission structure, reference pulse scale structure and reference pulse scanning structure, beams from one region of the reference pulse scale structure interact with a plurality of regions of the reference pulse scanning structure so that a first reference pulse of adequate intensity is detectable by the at least one detector element, wherein said first reference pulse occurs only when a predetermined relative position between two objects that are movable relative to one another is achieved.

2. The optical position measuring instrument of claim 1, wherein beams from one of the irregular distribution regions of the reference pulse scale structure, at the defined relative position, pass through a plurality of optically transparent regions of the reference pulse scanning structure.

3. The optical position measuring instrument of claim 1, wherein the irregular distribution regions of at least two of the three structures are formed by alternatingly optically transparent and opaque regions.

4. The optical position measuring instrument of claim 1, wherein the irregular distribution regions of at least one of the three structures are formed by alternatingly optically reflective and nonreflective regions.

5. The optical position measuring instrument of claim 1, wherein the reference pulse transmission structure and the reference pulse scanning structure include alternatingly arranged optically transparent and opaque regions, and the reference pulse scale structure includes alternatingly disposed reflective and nonreflective regions.

6. The optical position measuring instrument of claim 3, wherein the reference pulse transmission structure is disposed on a first substrate element, the reference pulse scanning structure is disposed on a second substrate element, and the reference pulse scale structure is disposed on a third substrate element wherein, the second substrate element is movable relative to the first and the third substrate elements.

7. The optical position measuring instrument of claim 6, wherein the first, second and third substrate elements are transparent to light.

8. The optical position measuring instrument of claim 7, further comprising an incremental scale division disposed on the third substrate element and an incremental scanning division disposed on the second substrate element for generating incremental position signals.

9. The optical position measuring instrument of claim 5, wherein the reference pulse transmission structure and the reference pulse scanning structure are disposed on one common first substrate element, and the reference pulse scale structure is disposed on a second substrate element, which is movable relative to the first substrate element.

10. The optical position measuring instrument of claim 9, wherein the first substrate element is transparent to light.

11. The optical position measuring instrument of claim 9, wherein the light source and the at least one optoelectronic detector element are also disposed on the first substrate element.

12. The optical position measuring instrument of claim 9, further comprising at least one incremental scale division is disposed on the second substrate element, and an incremental scanning division disposed on the first substrate element for generating the incremental position signals.

13. The optical position measuring instrument of claim 1, further comprising a second reference pulse transmission structure, a second reference pulse scale structure and a second reference pulse scanning structure, which are illuminated by the light source and at least one second optoelectronic detector element for detecting a second reference pulse signal, wherein the second reference pulse transmission structure, the second reference pulse scale structure and the second reference pulse scanning structure are dimensioned such that a second reference pulse signal complementary to the first reference pulse signal is generated, wherein said second reference pulse occurs only when said first predetermined relative position between said two objects is achieved.

14. The optical position measuring instrument of claim 8 or 12, wherein the reference pulse scale structure is disposed laterally adjacent to the incremental scale division.

15. The optical position measuring instrument of claim 13, wherein the first and second reference pulse scale structures are disposed on both sides of and adjacent to a incremental scale division.

16. The optical position measuring instrument of claim 13, wherein the second reference pulse scale structure is embodied inversely to the first reference pulse scale structure, while the reference pulse transmission structures and reference pulse scanning structures for generating the first and second reference pulse signals are embodied identically.

17. The optical position measuring instrument of claim 1, wherein the scanning structure is embodied by a structuring of the light-sensitive surface of the optoelectronic detector element.

18. The optical position measuring instrument of claim 1, wherein the first and second distributions are chosen so that it is assured that an interaction of the beam arriving from a region of the reference pulse scale structure with a plurality of regions of the reference pulse scanning structure occurs.

19. An optical position measuring instrument for generating position signals regarding the relative location of two objects movable relative to one another, wherein the measuring instrument additionally generates at least one reference pulse signal regarding a defined relative position of the two objects, the measuring instrument comprising:

a light source for emitting a beam of light;

a reference pulse transmission structure disposed upstream of the light source having a first, irregular distribution of regions having two different optical properties wherein the beam of light has a beam path between the light source and the reference pulse transmission structure that is divergent;

a reference pulse scale structure, disposed adjacent to the reference pulse transmission structure, the reference pulse scale structure is integrated directly with an incremental scale division and has a second irregular distribution of regions having two different optical properties;

a reference pulse scanning structure, disposed downstream of the reference pulse scale structure, the reference pulse scanning structure has a third irregular distribution of regions having two different optical properties, wherein the reference pulse scale structure is movable relative to the reference pulse transmission structure and the reference pulse scanning structure; and at least one optoelectronic detector element for detecting a beam output by the reference pulse scanning structure;

wherein the first, second and third irregular distribution of regions are selected such that at a defined relative position of the reference pulse transmission structure, reference pulse scale structure and reference pulse scanning structure, beams from one region of the reference pulse scale structure interact with a plurality of regions of the reference pulse scanning structure so that a first reference pulse of adequate intensity is detectable by the at least one detector element, wherein said first reference pulse occurs only when a predetermined relative position between two objects that are movable relative to one another is achieved.

20. The optical position measuring instrument of claim 19, wherein the reference pulse transmission structure and the reference pulse scanning structure include alternatingly arranged optically transparent and opaque regions, and the reference pulse scale structure includes alternatingly disposed reflective and nonreflective regions.

21. The optical position measuring instrument of claim 19, wherein the reference pulse transmission structure and the reference pulse scanning structure are disposed on one common first substrate element, and the reference pulse scale structure is disposed on a second substrate element, which is movable relative to the first substrate element.

22. The optical position measuring instrument of claim 19, wherein the first and second distributions are chosen so that it is assured that an interaction of the beam arriving from a region of the reference pulse scale structure with a plurality of regions of the reference pulse scanning structure occurs.

23. An optical position measuring instrument for generating position signals regarding the relative location of two objects movable relative to one another, wherein the measuring instrument additionally generates at least one reference pulse signal regarding a defined relative position of the two objects, the measuring instrument comprising:

a light source for emitting a beam of light;

a reference pulse transmission structure disposed upstream of the light source having a first distribution of regions having two different optical properties wherein the first distribution of regions is not a continuous function of location and the beam of light has a beam path between the light source and the reference pulse transmission structure that is divergent;

a reference pulse scale structure, disposed adjacent to the reference pulse transmission structure, the reference pulse scale structure has a second distribution of regions having two different optical properties, wherein the second distribution of regions is not a continuous function of location and;

a reference pulse scanning structure, disposed downstream of the reference pulse scale structure, the reference pulse scanning structure having a third distribution of regions having two different optical properties, wherein the third distribution of regions is not a continuous function of location and the reference pulse scale structure is movable relative to the reference pulse transmission structure and the reference pulse scanning structure; and at least one optoelectronic detector element for detecting a beam output by the reference pulse scanning structure;

wherein the first, second and third distributions of re-ions are selected such that at a defined relative position of the reference pulse transmission structure, reference pulse scale structure and reference pulse scanning structure, beams from one region of the reference pulse scale structure interact with a plurality of regions of the reference pulse scanning structure so that a first reference pulse of adequate intensity is detectable by the at least one detector element.

24. The optical position measuring instrument of claim 23, wherein beams from one of the distribution regions of the reference pulse scale structure, at the defined relative position, pass through a plurality of optically transparent regions of the reference pulse scanning structure.

25. The optical position measuring instrument of claim 23, wherein the distribution regions of at least two of the three structures are formed by alternatingly optically transparent and opaque regions.

26. The optical position measuring instrument of claim 23, wherein the irregular distribution regions of at least one of the three structures are formed by alternatingly optically reflective and nonreflective regions.

27. The optical position measuring instrument of claim 23, wherein the reference pulse transmission structure and the reference pulse scanning structure include alternatingly arranged optically transparent and opaque regions, and the reference pulse scale structure includes alternatingly disposed reflective and nonreflective regions.

28. The optical position measuring instrument of claim 25, wherein the reference pulse transmission structure is disposed on a first substrate element, the reference pulse scanning structure is disposed on a second substrate element, and the reference pulse scale structure is disposed on a third substrate element wherein, the second substrate element is movable relative to the first and the third substrate elements.

29. The optical position measuring instrument of claim 28, wherein the first, second and third substrate elements are transparent to light.

30. The optical position measuring instrument of claim 29, further comprising an incremental scale division disposed on the third substrate element and an incremental scanning division disposed on the second substrate element for generating incremental position signals.

31. The optical position measuring instrument of claim 27, wherein the reference pulse transmission structure and the reference pulse scanning structure are disposed on one common first substrate element, and the reference pulse scale structure is disposed on a second substrate element, which is movable relative to the first substrate element.

32. The optical position measuring instrument of claim 31, wherein the light source and the at least one optoelectronic detector element are also disposed on the first substrate element.

33. The optical position measuring instrument of claim 31, further comprising at least one incremental scale division is disposed on the second substrate element, and an incremental scanning division disposed on the first substrate element for generating the incremental position signals.

34. The optical position measuring instrument of claim 23, further comprising a second reference pulse transmission structure, a second reference pulse scale structure and a second reference pulse scanning structure, which are illuminated by the light source and at least one second optoelectronic detector element for detecting a second reference pulse signal, wherein the second reference pulse transmission structure, the second reference pulse scale structure and the second reference pulse scanning structure are dimensioned such that a second reference pulse signal complementary to the first reference pulse signal is generated, wherein said second reference pulse occurs only when said first predetermined relative position between said two objects is achieved.

35. The optical position measuring instrument of claim 34, wherein the first and second reference pulse scale structures are disposed on both sides of and adjacent to an incremental scale division.

36. The optical position measuring instrument of claim 34, wherein the second reference pulse scale structure is embodied inversely to the first reference pulse scale structure, while the reference pulse transmission structures and reference pulse scanning structures for generating the first and second reference pulse signals are embodied identically.

37. The optical position measuring instrument of claim 23, wherein the first and second distributions are chosen so that it is assured that an interaction of the beam arriving from a region of the reference pulse scale structure with a plurality of regions of the reference pulse scanning structure occurs.

* * * * *

UNITED STATES PATENT AND TRADEMARK OFFICE
CERTIFICATE OF CORRECTION

PATENT NO. : 6,097,490
DATED : August 1, 2000
INVENTOR(S) : Wolfgang Holzapfel et al.

It is certified that error appears in the above-identified patent and that said Letters Patent is hereby corrected as shown below:

In the Claims

In claim 13, line 7, delete "," (comma).

In claim 15, line 3, delete "a" and substitute --an-- in its place.

In claim 23, line 20, delete "location and;" and substitute --location; and-- in its place.

In claim 23, line 33, delete "re-ions" and substitute --regions-- in its place.

In claim 33, lines 1-2, delete "3 1" and substitute --31-- in its place.

Signed and Sealed this

Fifteenth Day of May, 2001

*Attest:*

NICHOLAS P. GODICI

*Attesting Officer*   Acting Director of the United States Patent and Trademark Office